United States Patent [19]
Lee

[11] Patent Number: 6,023,265
[45] Date of Patent: Feb. 8, 2000

[54] TOUCHED STATE RECOGNITION APPARATUS FOR MATRIX TYPE TOUCH PANEL AND A CONTROL METHOD THEREOF

[75] Inventor: Joon-No Lee, Kyungki, Rep. of Korea

[73] Assignee: LG Industrial Systems Co., Ltd., Seoul, Rep. of Korea

[21] Appl. No.: 08/917,866

[22] Filed: Aug. 27, 1997

[30] Foreign Application Priority Data

Aug. 28, 1996 [KR]  Rep. of Korea ................... 96-35986

[51] Int. Cl.⁷ .................................................... G09G 5/00
[52] U.S. Cl. .......................................... 345/173; 345/146
[58] Field of Search .................................. 345/173, 174, 345/175, 145, 146

[56] References Cited

U.S. PATENT DOCUMENTS 5,740,390  4/1998  Pickover ................................. 395/348
5,757,358  5/1998  Osga ....................................... 345/146

Primary Examiner—Steven J. Saras
Assistant Examiner—Tewolde Mengisteab

[57] ABSTRACT

A touched state recognition apparatus for a matrix type touch panel and a control method thereof which are capable of correctly recognizing a touched state of a touch switch even when two touch switches are concurrently touched. The touched state recognition apparatus for a matrix type touch panel which includes a touch panel which acts as a switch or a keyboard and has an upper plate and a lower plate each having a plurality of electrodes, a touch processor for applying a checking signal to the touch panel, receiving a detection signal with respect to the touched region, judging the touched region, comparing the number of touch switches contained in the touched region with the area of the touch switch, and judging the touched touch switch, a memory for storing a graphic data therein which corresponds to a coordinate of a region of the touch panel and each touch switch therein, a microprocessor for receiving a signal from the touch processor, which signal corresponds to whether a predetermined touch switch is touched, executing a screen control program corresponding to the touch switch, reading a graphic data from the memory, and outputting the thusly read graphic data, a graphic controller for outputting a graphic signal by which a graphic data from the microprocessor is displayed, and a display device for receiving the graphic signal from the graphic controller and displaying the same.

5 Claims, 5 Drawing Sheets

TOUCHED STATE RECOGNITION APPARATUS FOR MATRIX TYPE TOUCH PANEL AND A CONTROL METHOD THEREOF

BACKGROUND OF THE INVENTION

1. Field of the Invention

The present invention relates to a touched state recognition apparatus for a matrix type touch panel and a control method thereof, and in particular to an improved touched state recognition apparatus for a matrix type touch panel and a control method thereof which are capable of preventing an erroneous touched state recognition when two touch switches are concurrently touched and avoiding a problem which occurs while a touch switch is not touched.

2. Description of the Conventional Art

As shown in FIG. 1, the conventional touched state recognition apparatus for a matrix type touch panel includes a touch panel 1 for recognizing a touched state thereof by a user, a memory 2 for storing a graphic data GRD which is used for executing a screen control program, a microprocessor 3 for applying a checking signal VI to the touch panel 1, detecting a detection signal VO corresponding to a switch touched by a user, and recognizing whether a predetermined region of the touch panel 1 is touched by the user, reading a graphic data GRD from the memory 2, and executing a screen control program, a graphic controller 4 for receiving the graphic data GRD read from the memory 2, through the microprocessor 3, and a display device 5 for displaying a graphic signal from the graphic controller 4.

Here, as shown in FIG. 2, the touch panel 1 includes an upper plate 1A made of a synthetic resin and having electrodes A through G and a lower plate having electrodes A' through F'.

As shown in FIG. 3, the operation of the touch panel 1 will now be explained in the case that the number of touch regions are 42, 7 in the horizontal direction and 6 in the vertical direction.

5 voltage (hereinafter called as a checking signal VI) is applied to the electrode A of the upper plate 1A, and 0 voltage is applied to the remaining electrodes B through G, and then the electrodes A' through F' of the lower plate 1B are checked whether 5 voltage (hereinafter called as a detection signal VO) is applied thereto.

The above-described operation is repeatedly performed with respect to the electrodes B through G of the upper plate 1A, and the detection signal VO is detected with respect to the electrodes A' through F' of the lower plate 1B.

If a hatched region of FIG. 3 is touched, it is easily judged that the electrode D of the upper plate 1A and the electrode D' of the lower plate 1B are touched by the above-described manner.

The operation that the touched state of the touch panel 1 and the graphic data corresponding thereto are displayed will now be explained with reference to FIG. 1.

First, the touch panel 1 is touched in order to obtain an information that a user wants, the microprocessor 3 applies the checking signal VI to the touch panel 1 and receives an output signal VO from the touch panel 1 for checking whether a predetermined switch is touched.

Then, the microprocessor 3 judges whether the detected region corresponds to a predetermined touch switch and executes the screen control program for displaying a graphic information corresponding to the touch switch. At this time, the graphic data GRD is read from the memory 2 and is transmitted to the graphic controller 4.

The graphic controller 3 outputs a graphic signal GRS to be displayed on the display device 5, so that the graphic information corresponding to the touched touch switch is displayed.

Then, the user sees the screen and obtains a desired information displayed thereon.

If the user a user wishes to obtain another information, the user touches the touch panel 1. The remaining operation thereafter is the same as described above.

However, there is a limit in the resolution of the conventional matrix type touch panel, namely, in the size of the region in which the upper plate 1A is formed across the lower plate 1B. Generally, the size of a region of the touch panel 1B is 5 mm to 15 mm. Therefore, when defining the shape of a touch switch on the touch panel, the shape thereof should match with the resolution thereof. If the shape of the touch switch is not matched with the resolution thereof, the touched state of the touch panel may not be recognized.

Namely, assuming that the shapes of the touch switches TSW1 and TSW2 are defined on the screen as shown in FIG. 3, when a user touches a hatched region, it may be judged that the first touch switch TSW1 and the second touch switch TSW2 are concurrently touched, thus causing an erroneous recognition.

SUMMARY OF THE INVENTION

Accordingly, it is an object of the present invention to provide a touched state recognition apparatus for a matrix type touch panel and a control method thereof which overcome the aforementioned problems encountered in the conventional art.

It is another object of the present invention to provide a touched state recognition apparatus for a matrix type touch panel and a control method thereof which are capable of correctly recognizing a touched state of a touch switch even when two touch switches are concurrently touched.

To achieve the above objects, there is provided a touched state recognition apparatus for a matrix type touch panel which includes a touch panel which acts as a switch or a keyboard and has an upper plate and a lower plate each having a plurality of electrodes, a touch processor for applying a checking signal to the touch panel, receiving a detection signal with respect to the touched region, judging the touched region, comparing the number of touch switches contained in the touched region with the area of the touch switch, and judging the touched touch switch, a memory for storing a graphic data therein which corresponds to a coordinate of a region of the touch panel and each touch switch therein, a microprocessor for receiving a signal from the touch processor, which signal corresponds to whether a predetermined touch switch is touched, executing a screen control program corresponding to the touch switch, reading a graphic data from the memory, and outputting the thusly read graphic data, a graphic controller for outputting a graphic signal by which a graphic data from the microprocessor is displayed, and a display device for receiving the graphic signal from the graphic controller and displaying the same.

To achieve the above objects, there is provided a touched state recognition method for a matrix type touch panel which includes the steps of a first step for setting a coordinate of a point of each region of a touch panel and a coordinate of a point of each region of a touch switch, applying a checking signal to the touch panel and detecting a detection signal with respect to the touched region, a second step for recognizing a detection signal detected in the first step and detecting a touch switch contained in the touched region, a third step for checking the number of touch switches detected in the second step, a fourth step for computing a region of each touch switch contained in the touched region when more than two touch switches are contained in the region in the third step, and a fifth step for comparing the results computed in the fourth step and judging the touched touch switch.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 5:
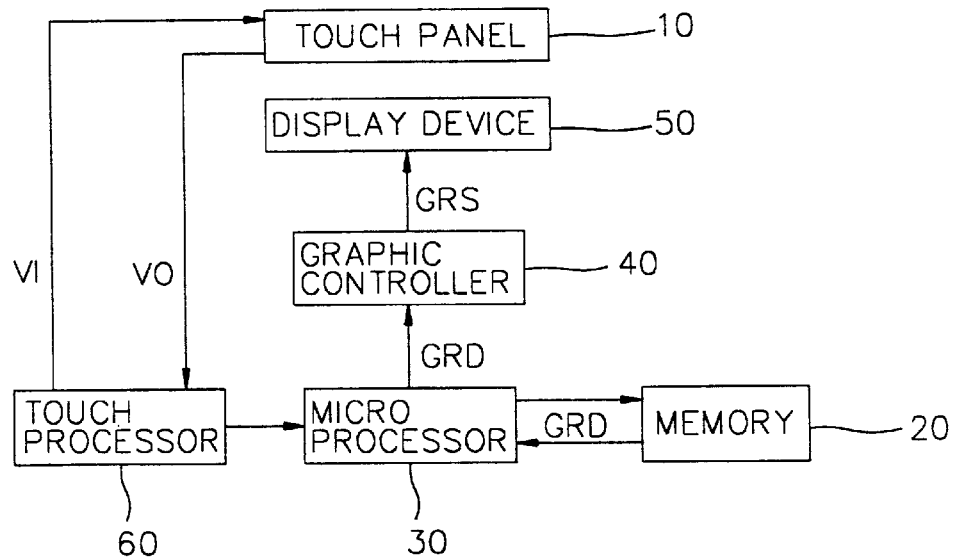
FIG. 5 is a block diagram illustrating a touched state recognition apparatus for a matrix type touch panel according to the present invention.

As shown in FIG. 5, the touched state recognition apparatus for a matrix type touch panel according to the present invention includes a touch panel 10 which acts as a switch or a keyboard and includes an upper plate 1A having a plurality of electrodes and a lower plate 1B having a plurality of electrodes, a touch processor 60 for applying a checking signal VI to the touch panel 10, receiving a detection signal with respect to a touched portion, judging a touched region, and computing the number of touch switches contained in the touched region and the area of the touched region, a memory 20 for storing a graphic data GRD therein corresponding to the coordinates of the regions of the touch switches and touch panels and each touch switch, a microprocessor 30 for receiving a signal from the touch processor 60 which signal corresponds to whether a touch switch is touched, executing a screen control program for outputting an information corresponding to the touch switch, and reading a graphic data GRD from the memory 20, a graphic controller 40 for outputting a graphic signal GRS by which the graphic data GRD outputted from the microprocessor 30 is displayed, and a display device 50 for receiving a graphic signal GRS from the graphic controller 40 and displaying the same.

Figure 6:
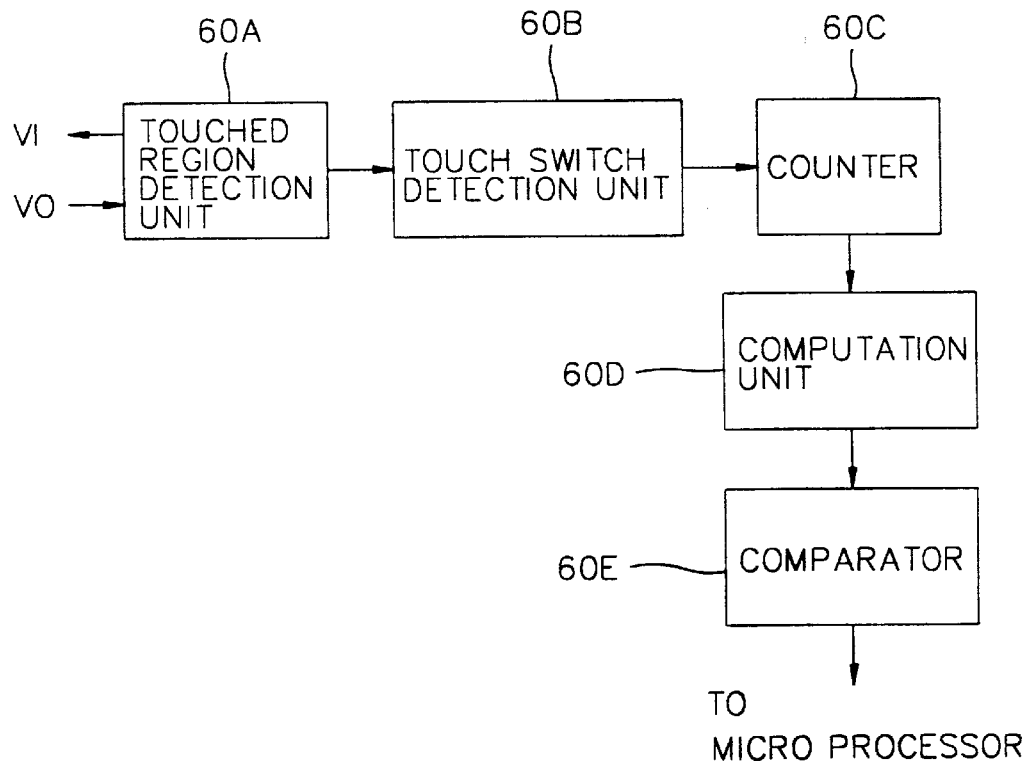
FIG. 6 is a detailed block diagram illustrating a touch processor of FIG. 5 according to the present invention.

As shown in FIG. 6, the touch processor 60 includes a region detection unit 60A for detecting a touched region, a touch switch detection unit 60B for judging a touch switch contained in the touched region, a counter 60C for counting the number of the touch switches detected by the touch switch detection unit 60B, a computation unit 60D for computing the area of the touch switch contained in the touched region and a comparing unit 60E for comparing the areas of the touch switches computed by the computation unit 60D.

The operation of a touched state recognition apparatus for a matrix type touch panel according to the present invention will now be explained.

When a user touches a touch switch displayed on the touch panel 10 in order to obtain a desired information, a checking signal VI is applied from a touched region detection unit 60A of the touch processor 60 to the touch panel 10, and a detection signal VO with respect to the touched region is received. Thereafter, a coordinate of each region is read from the memory, thus detecting whether a predetermined region is touched.

In addition, a touch switch detection unit 60B defined in the touched region reads a coordinate of each touch switch from the memory 20 and detects a touch switch defined in the touched region.

A counter 60c provided for counting the number of touch switches defined in the touched region counts the number of touch switches detected by the touch switch detection unit 60B defined in the touched region.

Figure 1:
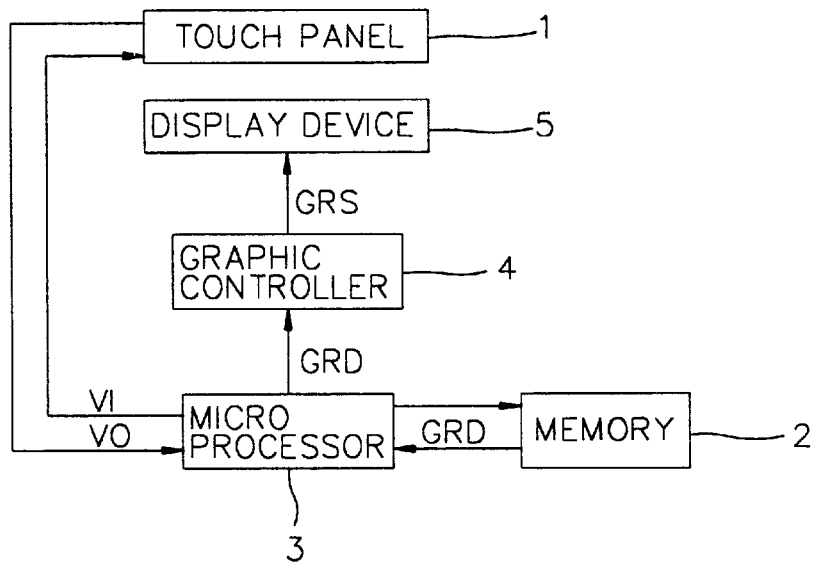
FIG. 1 is a block diagram illustrating a conventional touched state recognition apparatus for a matrix type touch panel.
Figure 2:
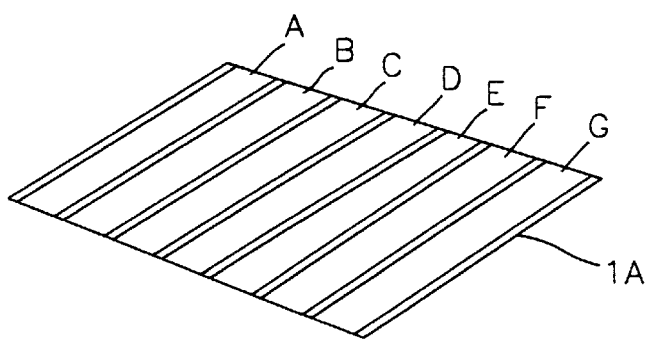
FIG. 2 is a view illustrating the construction of a touch panel of FIG. 1.
Figure 2:
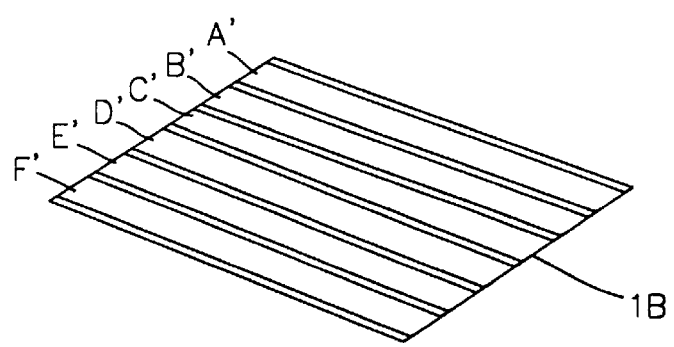
Figure 3:
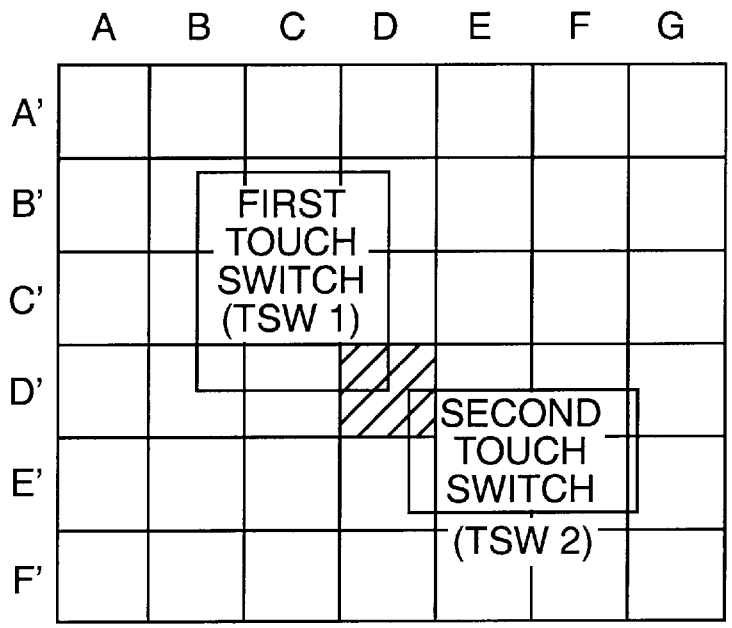
FIG. 3 is a view illustrating a touch panel in which touch switches are arranged.
Figure 4:
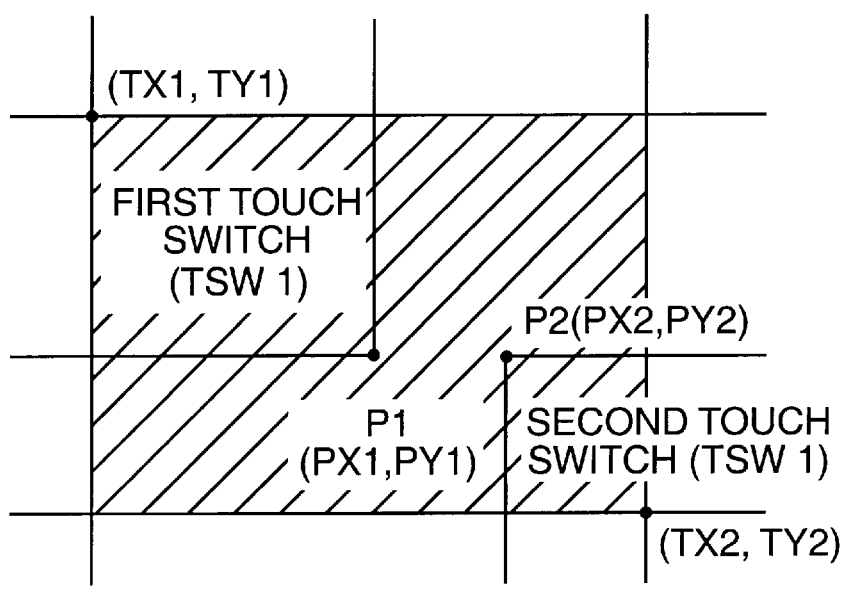
FIG. 4 is a view illustrating a touch panel of FIG. 3 when two touch switches are concurrently touched.

At this time, when the number of touch switches that the counter 60C counted is more than 2, namely, when a user touches the hatched region shown in FIGS. 3 and 4, it is judged that two switches TSW1 and TSW2 are concurrently touched, so that it is possible to judge whether a predetermined touch switch is touched.

The method of judging whether a predetermined touch switch is touched will now be explained with reference to the accompanying drawings.

If a user erroneously touches a hatched region in which two touch switches are overlapped as shown in FIGS. 3 and 4, the area of each touch switch defined in the touched region is computed by a computation unit 60D, and it is judged that a touch switch defined in a wider area is touched.

Therefore, the computation unit 60D computes the area of each switch defined in the touched region as follows.

As shown in FIG. 4, the coordinates at a point P1 which is defined in a region in which a first touch switch TSW1 is touched are assumed as PX1 and PY1, the coordinates at a point P2 which is defined in a region in which a second touch switch TSW2 is touched are assumed as PX2 and PY2, and the coordinates defined in each touch switch among the points of the touched region are assumed as TX1, TY1 and TX2, TY2.

First, the coordinate PX1 at the point P1 is judged to be a right side coordinate or a left side coordinate of the region of the touch switch. This judgement is easily performed if the coordinates of the touch switches are stored in the memory 20, for example, in a sequence of a left side X-axis coordinate, an upper Y-axis coordinate, a right side X-axis coordinate, and a lower Y-axis coordinate.

As a result of the judgement, in the case of a right side coordinate, "PX1-TX1" is defined as the length in the direction of an X-axis, and in the case of a left side coordinate, "TX2-PX2" is defined as the length in the direction of an X-axis as shown in FIG. 4.

In addition, in order to compute the length in the direction of a Y-axis, the coordinate of PY1 should be judged to be an upper coordinate or a lower coordinate.

In the case of an upper coordinate, the length in the direction of a Y-axis is defined as TY2-PY2.

The lengths in the directions of X-axis and Y-axis corresponding to the point P2 become TX2-PX2 and TY2-PY2, respectively, which are computed in the above-described manner.

Therefore, the regions defined by the first touch switch (TSW1) and the second touch switch(TSW2) become (PX1-TX1)×(PY1-TY1) and (TX2-PX2)×(TY2-PY2), respectively.

The comparing unit 60E compares the above-described values, judges that the touch switch having a greater value as a result of the comparison is touched, and outputs a judged result to the microprocessor 30.

When the touched touch switch is determined, the microprocessor 30 reads a graphic data GRD, which corresponds to the touched touch switch, from the memory 20 and outputs the same to the graphic controller 40.

The graphic controller 40 converts the received graphic data GRD into a graphic signal GRS to be displayed and outputs the thusly converted signal to the display device 50, thus displaying an information to be used for a user who touched the touch panel 10.

Figure 7:
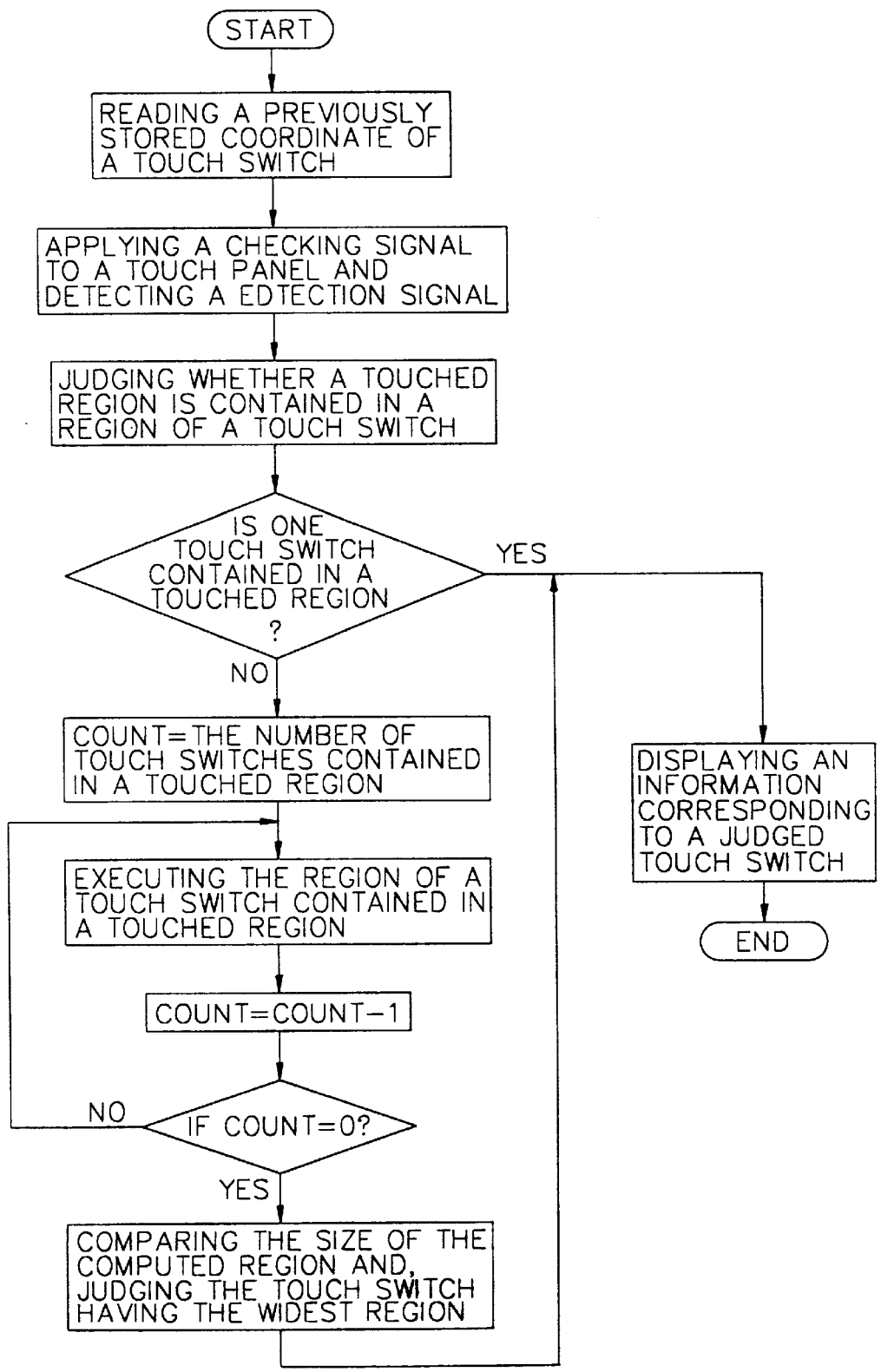
FIG. 7 is a flow chart illustrating a touched state recognition control method for a matrix type touch panel according to the present invention.

The touched state recognition control method for a matrix type touch panel according to the present invention will now be explained with reference to FIG. 7.

First, when a user touches the touch switch of the touch panel 10 in order to obtain a desired information, the coordinate of the touch switch which is previously stored is read, and the touched region is detected, and it is judged that the touched region is contained in the region of a touch switch.

When the touched touch switch is determined, it is judged that how many touch switches are contained in the touched region.

Thereafter, the number of touch switches is counted, and the size of the region contained the touched region of the touch switch is computed.

Figure 8:
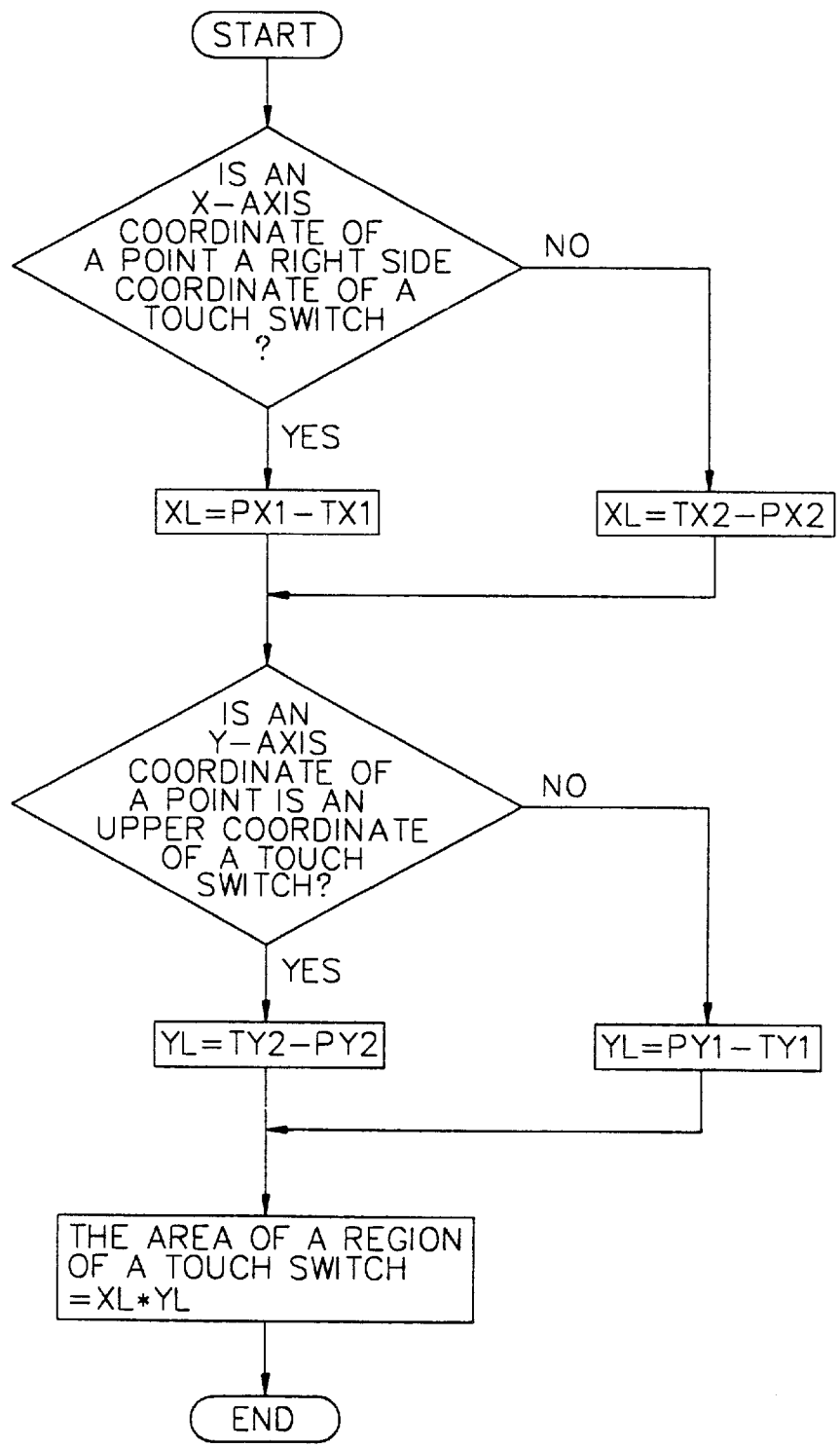
FIG. 8 is a flow chart illustrating a method for computing a region of a touch switch contained in a touched region according to the present invention.

Here, the size of the region of the touch switch contained in the touched region is computed by the method shown in FIG. 8, which method is directed to computing the region of the touch switch contained in the touched region.

Namely, the coordinate of the point of the touch switch contained in the touched region is read from the memory 20, and it is judged that whether the coordinate corresponds to the right side coordinate or the left side coordinate of the touch switch and the upper coordinate and the lower coordinate of the touch switch.

The lengths in the directions of the X-axis and the Y-axis of the touch switch contained in the touched region are computed in accordance with a judgement result, and the lengths in the directions of the X-axis and Y-axis are multiplied by each other, thus computing a touch switch region.

The regions of the touch switches TSW1 and TSW2 contained the touched region are computed, and the thusly computed regions are compared. As a result of the comparison, the touch switch contained in the widest region is judged to be a touched touch switch, and the information corresponding to the touch switch is displayed on the screen.

Therefore, in the present invention, it is possible to prevent an erroneous recognition of a touch switch when more than two touch switches are concurrently touched.

As described above, the touched state recognition apparatus for a matrix type touch panel and a control method thereof are directed to preventing an erroneous recognition of a touch switch when more than two touch switches of a touch panel are concurrently touched by providing a processor which is capable of computing the region of the touch switch contained in the touched region of the touch panel, thus computing the touched regions, whereby it is possible to correctly recognize that a touch switch having the widest area is touched by comparing the thusly computed values.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A touched state recognition apparatus for a matrix type touch panel, comprising:
    a touch panel which acts as a switch or a keyboard and has an upper plate and a lower plate each having a plurality of electrodes;
    a touch processor for applying a checking signal to the touch panel, receiving a detection signal with respect to the touched region, judging the touched region, comparing the number of touch switches contained in the touched region with the area of the touch switch, and judging the touched touch switch;
    a memory for storing a graphic data therein which corresponds to a coordinate of a region of the touch panel and each touch switch therein;
    a microprocessor for receiving a signal from the touch processor, which signal corresponds to whether a predetermined touch switch is touched, executing a screen control program corresponding to the touch switch, reading a graphic data from the memory, and outputting the thusly read graphic data;
    a graphic controller for outputting a graphic signal by which a graphic data from the microprocessor is displayed; and
    a display device for receiving the graphic signal from the graphic controller and displaying the same.

2. The apparatus of claim 1, wherein said touch processor includes:
    a region detection means for detecting a touched region;
    a touch switch detection means for judging a touch switch contained in the touched region;
    a counter for counting the number of the touch switches detected by the touch switch detection means;
    a computation means for computing the area of the touch switch contained in the touched region; and
    a comparing means for comparing the areas of the touch switches computed by the computation means.

3. A touched state recognition control method for a matrix type touch panel, comprising:
    a first step for setting a coordinate of a point of each region of a touch panel and a coordinate of a point of each region of a touch switch, applying a checking signal to the touch panel and detecting a detection signal with respect to the touched region;
    a second step for recognizing a detection signal detected in the first step and detecting a touch switch contained in the touched region;
    a third step for checking the number of touch switches detected in the second step;
    a fourth step for computing a region of each touch switch contained in the touched region when more than two touch switches are contained in the region in the third step; and a fifth step for comparing the results computed in the fourth step and judging the touched touch switch.

4. The method of claim 3, wherein said fourth step includes a sub-step in which the horizontal and vertical lengths of the region of each touch region contained in the touched region are computed by using a coordinate of a point of each touch switch contained in the touched region and a coordinate of a point of the touched region, the thusly computed horizontal and vertical lengths are multiplied by each other, and the region of the touch switch is computed.

5. The method of claim 3, wherein said fifth step includes a sub-step in which a touch switch having the widest area is judged to be a touched touch switch by comparing the regions of each touch switch contained in the touched region.

* * * * *